United States Patent
Hutchison, IV et al.

(10) Patent No.: US 6,725,061 B1
(45) Date of Patent: Apr. 20, 2004

(54) SYSTEM AND METHOD FOR THE AUTOMATIC IDENTIFICATION OF ACCESSORIES COUPLED TO A WIRELESS COMMUNICATION DEVICE

(75) Inventors: James A. Hutchison, IV, San Diego, CA (US); Steven C. Den Beste, San Diego, CA (US); Hanchi Huang, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/229,131

(22) Filed: Jan. 12, 1999

(51) Int. Cl.$^7$ ................................................. H04Q 7/20
(52) U.S. Cl. ........................................ 455/557; 455/420
(58) Field of Search .......................... 455/90, 575, 557, 455/569, 420, 68, 99, 100, 558, 559, 556, 67.4, 88; 37/442; 710/8, 9, 11, 15, 16, 18

(56) References Cited

U.S. PATENT DOCUMENTS

| | | | | |
|---|---|---|---|---|
| 4,654,883 A | * | 3/1987 | Iwata | 455/575 |
| 4,792,986 A | * | 12/1988 | Garner et al. | 455/575 |
| 4,903,325 A | * | 2/1990 | Yoshitake et al. | 455/575 |
| 5,175,728 A | * | 12/1992 | Caplan et al. | 370/359 |
| 5,257,413 A | * | 10/1993 | Warner et al. | 455/557 |
| 5,301,360 A | * | 4/1994 | Goldberg | 455/67.4 |
| 5,367,563 A | * | 11/1994 | Sainton | 379/93.29 |
| 5,438,685 A | * | 8/1995 | Sorensen et al. | 455/90 |
| 5,450,275 A | * | 9/1995 | Russell et al. | 704/275 |
| 5,479,479 A | * | 12/1995 | Braitberg et al. | 455/404 |
| 5,577,269 A | * | 11/1996 | Ludewig | 455/90 |
| 5,590,417 A | * | 12/1996 | Rydbeck | 455/568 |
| 5,613,222 A | * | 3/1997 | Guenther | 455/568 |
| 5,636,264 A | * | 6/1997 | Sulavuori et al. | 359/113 |
| 5,640,444 A | * | 6/1997 | O'Sullivan | 455/553 |
| 5,659,594 A | * | 8/1997 | Toda | 455/552 |
| 5,659,887 A | * | 8/1997 | Ooe | 455/575 |
| 5,666,557 A | * | 9/1997 | Cassidy et al. | 710/8 |
| 5,703,932 A | * | 12/1997 | Oda | 379/355 |
| 5,754,962 A | * | 5/1998 | Griffin | 455/569 |
| 5,777,913 A | * | 7/1998 | Rasmusson | 708/322 |
| 5,822,427 A | * | 10/1998 | Braitberg et al. | 379/454 |
| 5,822,614 A | * | 10/1998 | Kenton et al. | 710/8 |
| 5,903,850 A | * | 5/1999 | Huttunen et al. | 455/575 |
| 5,956,651 A | * | 9/1999 | Willkie et al. | 455/553 |
| 6,012,105 A | * | 1/2000 | Rubbmark et al. | 710/14 |
| 6,112,103 A | * | 8/2000 | Puthuff | 455/557 |
| 6,285,890 B1 | * | 9/2001 | Panian | 455/557 |

* cited by examiner

Primary Examiner—Jean Gelin
(74) Attorney, Agent, or Firm—Philip R. Wadsworth; Charles D. Brown; Kevin T. Cheatham

(57) ABSTRACT

A wireless communication device having an accessory port and a processor to detect when an external accessory is coupled to the accessory port, and then identify the type of external accessory. A data line connects the external accessory to the wireless communication device, the data line being a portion of a pulse code modulation (PCM) port in the accessory port. The processor senses activity on this data line, including a signal transmitted by the external accessory indicative of when the external accessory is coupled to the wireless communication device. The processor further senses identification data associated with the external accessory, with the identification data including an identification code of the external accessory. The processor generates a clock signal, and the external accessory transmits the identification data to the wireless communication device over the data line in response to the clock signal. In this fashion, the processor repeatedly senses the transmitted identification data. An input line in the accessory port carries a voltage indicative of whether the external accessory supplies external power to the wireless communication device. The identification code transmitted by the external accessory is compared to stored codes corresponding to a plurality of external accessories to identify the external accessory coupled to the wireless communication device.

22 Claims, 4 Drawing Sheets

| DEVICE (201) | HIGH LOGIC LEVEL ON THE PCM-DIN | EXTERNAL POWER | DEVICE ID |
|---|---|---|---|
| COIL-CORD CARKIT | YES | YES | C3 HEX |
| NON-COIL-CORD CARKIT (210) | YES | YES | C2 HEX |
| HEADSET (202) | YES | NO | C1 HEX |
| COMPUTER INTERFACE | YES | YES/NO | 00 HEX |
| CHARGER | NO | YES | NOT APPLICABLE |
| RESERVED | | | OTHER VALUES |

FIG. 3

| KEYS | STATUS |
|---|---|
| HS_EXT_POWER_ON_K | EXTERNAL POWER DETECTED |
| HS_EXT_POWER_OFF_K | NO EXTERNAL POWER DETECTED |
| HS_EXT_DEV_K | PCM-DIN LOGIC HIGH DETECTED |
| HS_PHONE_K | PCM-DIN CHANGED TO STAY AT LOGIC LOW |
| HS_HFK_CORD_K | COIL-CORD DEVICE ID |
| HS_HFK_NOCORD_K | NON-COIL-CORD DEVICE ID |
| HS_HEADSET_K | HEADSET DEVICE ID |
| HS_DOTG_K | COMPUTER INTERFACE DEVICE ID |
| HS_DEV_UNKNOWN_K | UNKNOWN DEVICE |

FIG. 4

SYSTEM AND METHOD FOR THE AUTOMATIC IDENTIFICATION OF ACCESSORIES COUPLED TO A WIRELESS COMMUNICATION DEVICE

FIELD OF THE INVENTION

The present invention is related generally to wireless communication devices and connectable external accessories, and more particularly, to a system and method for detecting when an external accessory has been connected to the wireless communication device and for identifying the type of external accessory connected.

BACKGROUND OF THE INVENTION

Modern wireless communication devices, such as cellular telephones, are designed so that the user may connect external accessories to the cellular telephone, enabling the user to use the cellular telephone in a wider range of applications than if the cellular telephone were used by itself. For example, a headset accessory may be connected to some cellular telephones so that a microphone and earpiece are positioned in proximity of the user's mouth and ear, respectively, to permit hands-free operation of the cellular telephone. Another example of a common external accessory connectable to a cellular telephone is a carkit accessory that allows the cellular telephone to be used while driving an automobile without the inconvenience of holding the cellular telephone. The kit includes a microphone that can be attached to a convenient location within the automobile, and the kit is connected to the automobile's audio system so that the audible signals produced by the cellular telephone can be heard over the speakers of the audio system.

Other examples of common external accessory devices include a battery charger to recharge the internal battery of the wireless communication device and a computer interface that allows connection of a personal computer or laptop to the wireless communication device via a PCMCIA (Personal Computer Memory Card International Association) interface. Numerous other types of external accessories are available. These external accessories are connected to the wireless communication device by an extension cord having a fitting at its end. An accessory port of the wireless communication device receives the fitting, and in this fashion, the external accessory is electrically and communicatively coupled to the wireless communication device.

However, for a variety of reasons, there is an ongoing need to find a satisfactory way for the wireless communication device to identify when an external accessory has been coupled to the accessory port and to identify the type of external accessory. For example, if the user of the wireless communication device wishes to increase the volume of a call, the wireless communication device will need to know if the volume adjustments being made by the user are being directed towards the wireless communication device internal speaker or to a speaker of an external accessory. Without this ability to identify when and what kind of external accessory is coupled, the user may be mistakenly increasing the volume of the internal speaker within the device, instead of the volume of the speaker of the external accessory that the user intended to adjust. The present invention provides solutions to these problems, as will be apparent from the following detailed description and accompanying figures.

SUMMARY OF THE INVENTION

The present invention is embodied in a system and method directed to sensing when an external accessory is coupled to a wireless communication device, and to identifying the type of external accessory. In one embodiment, the wireless communication device includes an accessory port that allows an external accessory to be coupled to the wireless communication device, the accessory port including at least one data line, and a processor to sense activity on the data line when the external accessory has been coupled. The processor senses identification data associated with the external accessory to identify the external accessory.

In an exemplary embodiment, the data line is a portion of a pulse code modulation (PCM) port. The processor generates a clock signal coupled to the accessory port. The external accessory transmits identification data to the wireless communication device over the data line as determined by this clock signal.

In one embodiment, the phone detects activity on the data line as indicative of whether the external accessory is coupled to the wireless communication device. Also, the presence of voltage on an input line of the phone's accessory port is indicative of whether the external accessory provides power to the phone. The identification data includes an identification code of the external accessory. The processor identifies the type of external accessory by comparing the identification code with stored codes corresponding to a plurality of external accessories. The invention allows a wireless communication device to identify a carkit, headset, computer interface, battery charger, and other types of external accessories.

BRIEF DESCRIPTION OF THE DRAWINGS

FIG. 3 is a table listing identification data of several external accessories to the system of FIG. 1.

FIG. 4 is a table listing accessory interface keys that determine when an external accessory is coupled and that identify the type of external accessory coupled to the system of FIG. 1.

DETAILED DESCRIPTION OF THE PREFERRED EMBODIMENTS

A wireless communication device needs to be able to identify when and what kind of accessory has been coupled to its accessory port. The present invention will be discussed here in terms of a cellular telephone. Although described herein as a cellular telephone, the principles of the present invention are applicable to a variety of wireless communication devices including, but not limited to, cellular/PCS, radio telephone, conventional radio, and the like. Accordingly, the present invention is not limited by the specific form of wireless communication device.

Figure 1:
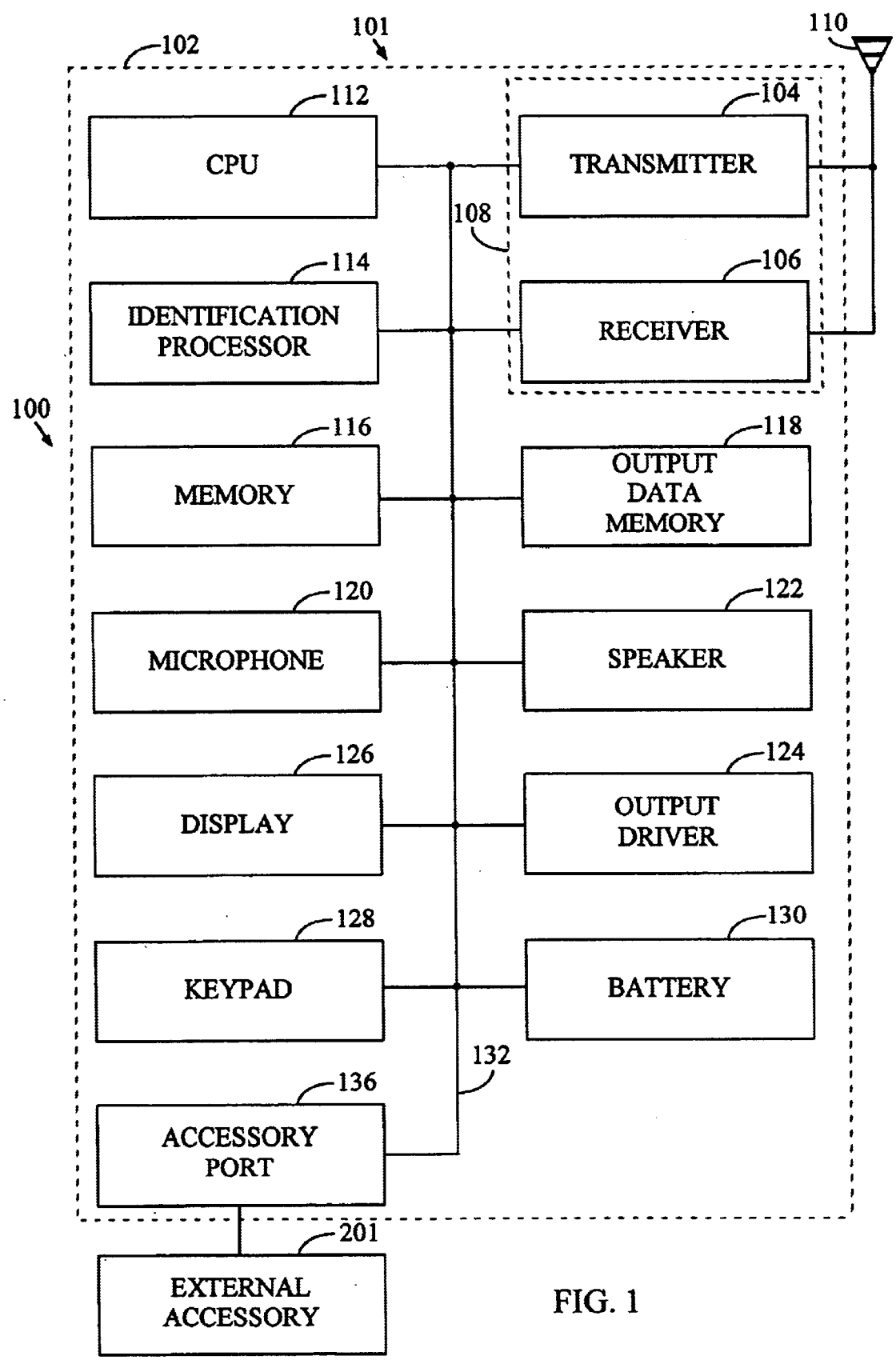
FIG. 1 is a functional block diagram of an exemplary embodiment of the wireless communication system of the present invention.
Figure 2:
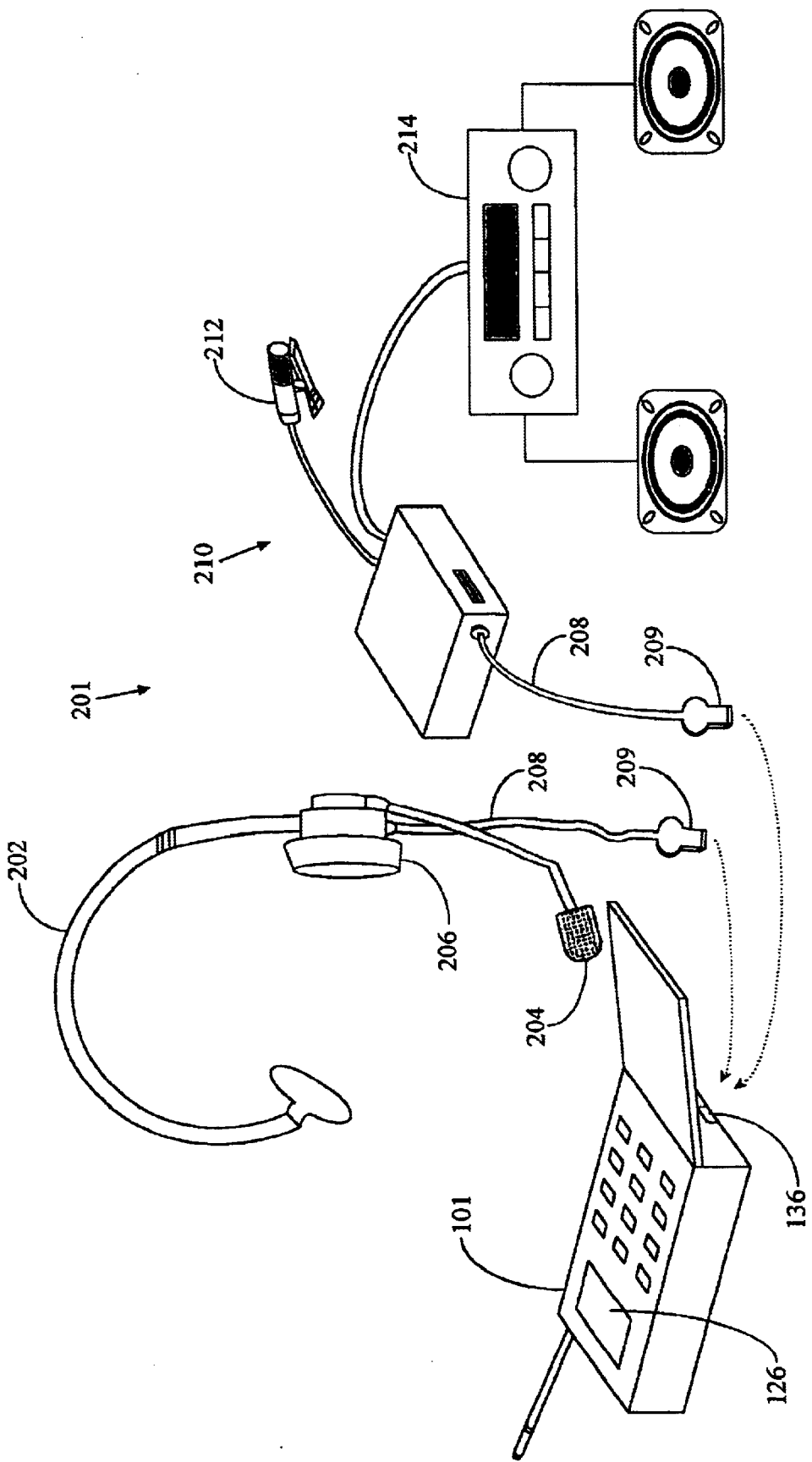
FIG. 2 illustrates the connection of two different external accessories to the system of FIG. 1.

The present invention is embodied in a system 100 illustrated in the functional block diagram of FIG. 1. The system 100 includes a wireless communication device 101 and an external accessory 201, two of which are illustrated in FIG. 2 as either a headset accessory 202 or a carkit accessory 210. Although there are many other possible external accessories that may be connected to the wireless communication device 101, in the interest of brevity, not all of them are shown or fully described herein. However, the absence of any description of these external accessories is not meant to limit the scope of the invention.

The wireless communication device 101, which may be embodied in a cellular telephone, includes a housing 102 that contains a transmitter 104 and a receiver 106 to allow transmission and reception of data, such as audio communications, between the system 100 and a remote location, such as a cell site controller (not shown). The transmitter 104 and receiver 106 may be combined into a transceiver 108. An antenna 110 is attached to the housing 102 and electrically coupled to the transceiver 108. The operation of the transmitter 104, receiver 106, and antenna 110 is well known in the art and need not be described herein.

The wireless communication device 101 also includes a central processing unit (CPU) 112, which controls operation of the system 100. The CPU 112 may perform all the tasks involved with the operation of the system 100, or only a portion of them, where the remaining tasks are delegated to other processing units included in the system. For example, the wireless communication device 101 may include, in addition to CPU 112, an identification processor 114 for receiving and processing identification data. The identification data reflects whether the wireless communication device 101 is connected to an external accessory, and identifies the specific external accessory if one is connected. The identification processor 114 and the identification data will be described in greater detail below.

The wireless communication device 101 further includes a memory 116 which may include both read-only memory (ROM) and random access memory (RAM). A portion of the memory 116 may also include non-volatile random access memory to store information that must be present upon powering up the wireless communication device 101. The memory 116 is used generally to store instructions and data for processing by the CPU 112.

The wireless communication device 101 also includes an output data memory 118 that is devoted to storing information such as user programmable volume levels and the associated menu titles or labels for earpiece, ringer, key beep, and message alerts of the wireless communication device 101. The output data memory 118 may also store the identification data of an external accessory 201 connected to the wireless communication device 101.

The wireless communication device 101 also includes an audio input device, such as a microphone 120, and an audio output device, such as a speaker 122. The microphone 120 and speaker 122 operate in a conventional manner to provide two-way audio communication using the wireless communication device 101. The speaker 122 is driven by driving signals generated by an output driver 124. The driving signals provided by the output driver 124 will be converted by the speaker 122 into audible signals to transmit the voice of the caller to the user, or produce audible cues that assist the user in operating the wireless communication device 101.

The wireless communication device 101 also includes a display 126 to conveniently display user instructions as well as user-entered data, such as destination telephone numbers and alphanumeric text. The information shown on the display 126 provides visual cues that assist the user in the operation of the system 100. A keypad 128 is attached to the housing 102 for operation by the user in a conventional manner. The keypad 128 provides a convenient input device by which destination telephone numbers and commands may be entered by the user.

The electrical components of the system 100 receive power from a battery 130, which is attached to and supported by the housing 102. In an exemplary embodiment, the battery 130 is a rechargeable battery. In other embodiments, the system 100 may include a connector (not shown) for the connection of an external power source, such as an automobile power adapter, AC power adapter, or the like.

The various components of the system 100 are coupled together by a bus system 132 of the wireless communication device 101, which may include a power bus, control signal bus, and status signal bus in addition to a data bus. However, for the sake of clarity, the various buses are illustrated in FIG. 1 as the bus system 132.

External accessories 201 may be connected to wireless communication device 101 through an accessory port 136. The external accessories are connected to the bus system 132 through the accessory port 136. When connected to the wireless communication device 101, the external accessory 201 allows the wireless communication device to be used in a wide range of applications. As shown in FIG. 2, the external accessory 201 has an extension cord 208. A connector 209 at the end of the extension cord 208 allows the external accessory 201 to be coupled to the accessory port 136 of the wireless communication device 101. In general, the external accessory 201 is manufactured by the same manufacturer of the wireless communication device 101, thereby insuring compatibility between the two. However, it is also possible for an external accessory to be compatible with wireless communication devices made by other manufactures.

Some examples of the external accessories 201 are the headset accessory 202 and the carkit accessory 210, which are illustrated in FIG. 2. The headset accessory 202 is useful because the user does not need to hold the wireless communication device 101 during operation. The mouthpiece 204 and earpiece 206 are positioned by the headset 201 accessory and are used in place of the microphone 120 and speaker 122 (see FIG. 1) of the wireless communication device 101 whenever the headset accessory 202 is connected.

The carkit accessory 210 is also useful because an external microphone 212 attached to the interior of an automobile is used in place of the microphone 120, and the audible output signals produced by the wireless communication device are transmitted over an audio system 214 in the automobile. Thus, the user can use the wireless communication device and continue to drive using both hands without any distractions from trying to hold the wireless communication device.

There are many other different types of external accessories available. The carkit accessory 210 shown in FIG. 2 is a non-coil-cord carkit, where the cord 208 connecting the external accessory 210 to the wireless communication device 101 is a straight cord. Other types of carkits are available where the cord 208 is a coil, such as those commonly used on conventional telephones. A battery charger that charges the rechargeable battery 130 in the wireless communication device 101 is another common external accessory. A computer interface for a personal computer or laptop is yet another possible external accessory that can be coupled to the wireless communication device 101 via the accessory port 136. Illustrations of these other external accessories 201 are not shown or described in detail herein because they are familiar to those skilled in the art.

In order to support the operation of external accessory 201 and to update the user interface properly upon connection, the wireless communication device 101 needs to be able to identify external accessory 201 when it is first connected. The identification processor 114 does this by monitoring existing lines in the accessory port 136. Extensions of these lines run through the cord 208.

In an exemplary embodiment, the accessory port 136 is a pulse code modulation (PCM) port that transfers data between the wireless communication device 101 and the external accessory 201. The PCM port has four lines or pins. One of the lines is a PCM-Data-In (PCM-DIN) line for the transmission of data from the external accessory 201 to the wireless communication device 101. As will be described in further detail below, the identification processor 114 monitors this line for a voltage or status signal that indicates when an external accessory 201 is connected to the wireless communication device 101 and then for a device identification (ID) code of the external accessory 201. The other three lines in the accessory port 136 are a PCM-Data-Out (PCM-DOUT) line for transmission of data from the wireless communication device 101 to the external accessory 201, a clock line, and a synchronization line. The PCM port can also have a fifth line for grounding. It is to be appreciated that in some embodiments, the PCM port can have more or fewer lines. For example, clock and synchronization signals could be transmitted over the same line. Power and signal ground can share the same line.

If the external accessory 201 has an external power supply that supplies power to the wireless communication device 101, then a voltage level is detected by the identification processor 114 on a General Purpose Input/Output (GPIO) line of the wireless communication device 101. The GPIO line can be a part of the PCM port, or it can be a line external to the PCM port lines described above. PCM is not described herein in detail because it is familiar to those skilled in the art.

In an exemplary embodiment, the PCM-DIN line remains at low logic level when there is no external accessory 201 attached to the accessory port 136. Low logic level can be defined as either zero voltage level, a low voltage level, or a negative voltage level. Most external accessories, except for battery chargers, will transmit high logic level on the PCM-DIN line when the external accessory 201 is attached to the accessory port 136. High logic level is defined to be a voltage level higher than the low logic level voltage. FIG. 3 is a table listing several external accessories 201 and whether a particular external accessory 201 inserts a high logic level on the PCM-DIN line upon connection. The information shown in the table of FIG. 3 for known external accessories is stored in the memory 116 or in the output data memory 118, so that when a particular external accessory 201 is connected, the logic levels transmitted by the external accessory 201 are compared by the identification processor 114 with this known information.

Upon connection, the external accessory 201 transmits high logic level which may be in the form of pulses on the PCM-DIN line. The pulse width of low logic level is preferably set to be shorter than 50 milliseconds. The identification processor 114 is clocked to constantly monitor the PCM-DIN line in 50 millisecond intervals. If any high logic level is detected within this time interval, it indicates that an external accessory 201 has just attached to the wireless communication device 101. Otherwise, there is no external accessory 201 connected. It should be noted that a battery charger may be connected to the accessory port 136. Because the charger does not transfer data to the wireless communication device 101, the logic level on the PCM-DIN line remains low, as indicated in the table of FIG. 3. A person skilled in the art would know how to program the identification processor 114 to monitor the PCM-DIN line during intervals determined by a clock.

Some external accessories 201, such as the carkit 210 and a battery charger, also supply external power to the wireless communication device 101. The table of FIG. 3 identifies the external accessories 201 that supply external power. The identification processor 114 detects the presence of a voltage level coming from an external power line through a detector connected to a GPIO line of the wireless communication device 101. This voltage level, whether logic high or logic low, provides additional indication as to whether an external accessory 201 has been connected. For example, as shown in the table of FIG. 3, if the identification processor 114 detects both a low logic level on the PCM-DIN line and presence of external power, then it determines that a battery charger is connected. If the identification processor 114 detects the other combinations shown in the table of FIG. 3, then the identification processor 114 checks for a third set of information—the device ID code of the external accessory 201—on the PCM-DIN line, as will be described below. Like the data on the PCM-DIN signal line, the external power information for known external accessories, shown in the table of FIG. 3, is also stored in the memory 116 or in the output data memory 118, so that the identification processor 114 can compare the transmitted information with the known information stored in the memory 116 or in the output data memory 118.

Data transmitted by the external accessory 201 to the wireless communication device 101 along the data lines of the PCM port, including the device ID, are in a serial stream. In an exemplary embodiment, the PCM data runs at a data rate of 128 K bits/second. Eight bits out of every 16 bits are used to carry Vocoder data, which are compressed samples of audio data or fax data, for example. The remaining 8 bits of the 16 bits are known as the "pad-byte" or "pad character." In system 100, during the device identification the pad-byte is used to carry the ID information of the external accessory 201 during the communication interface between the external accessory and the wireless communication device 101. The external accessory 201 places a unique value in this pad-byte upon connection to wireless communication device 101. The unique value of the ID information is shown by the representative values listed in the table of FIG. 3. For example, the device ID of the headset 202 is C1 hexadecimal. These known values are also stored in the memory 116 or in the output data memory 118, so that the identification processor 114 can compare the ID information actually received from the external accessory 201 with the known values to identify the external accessory.

Data communication through the PCM-DIN line is not always reliable. Noise on the PCM-DIN line can cause errors in the transmitted data, including the value of the pad-byte. To ensure that the correct pad-byte value is obtained, the identification processor 114 reads the pad-byte multiple times, with minimum delay after each reading, to make sure that the data is consistent. The identification processor 114 synchronizes the transmission and reading of the data by generating a clock signal. The delay between reading periods, as defined by the clock signal, is 125 microseconds, which is the transmission time of each pad-byte. The external accessory 201 transmits the pad-byte data in response to receiving the clock signal. With this mechanism of repeatedly reading and comparing the pad-byte data, missed or skipped PCM samples do not affect the accuracy of the data value in the pad-byte.

The external power status signal on the GPIO line, the high logic level status signal and the device ID pad-byte data on the PCM-DIN line do not arrive at the PCM port at the same time. To support real-time operation of the wireless communication device 101, the identification processor 114 processes the signals and device ID data based on logic states of the system 100. That is, the identification processor 114 performs a particular function and remains in a predetermined state until directed to perform a different function and thereby change states. Software instructions, referred to as "keys," represent a change of states. For instance, a key may indicate that the identification processor 114 is toggling from monitoring for the high logic level status signal on the PCM-DIN line to reading the transmitted ID code. The table shown in FIG. 4 lists several representative keys and the corresponding status that the keys represent.

Figure 5:
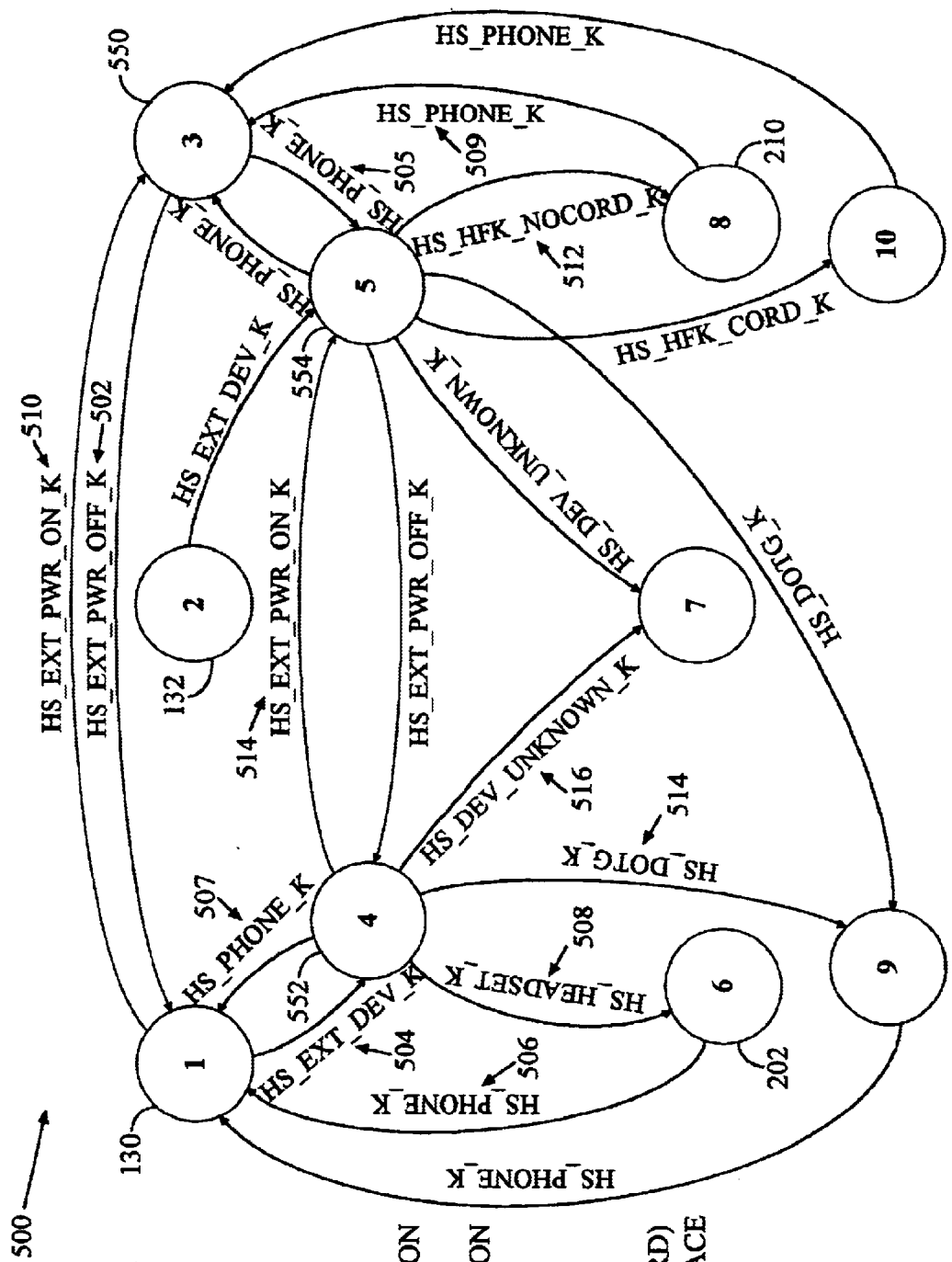
FIG. 5 is a flow chart illustrating how a processor of the system of FIG. 1 determines when an external accessory is coupled and identifies the type of external accessory coupled to the system of FIG. 1.

FIG. 5 illustrates a state machine flow chart 500 describing the operation of the system 100 using the keys listed in the table of FIG. 4 and the information shown in the table of FIG. 3. The encircled quantities represent different states of the system 100. The directional arrows, showing the delivery of various keys, represent a change from one state to another. Operation of this state machine flow chart 500 will be explained below for the headset 202 and the non-coil-cord carkit 210. The process to identify these two external accessories can be extended to identify the other external accessories listed in the table of FIG. 3. For example, the HS_EXT_POWER_ON_K key 510 indicates that external power from an external accessory 201 has been detected by the identification processor 114 on the GPIO line. Based on this state, key 510 would then direct the identification processor 114 to change to the next state of monitoring for a high logic level on the PCM-DIN line. The keys listed in the table of FIG. 4 drive system 100 from one state to another and towards the state in which the external accessory 201 is fully identified.

Referring to FIG. 5 and choosing a state 130 as an initial state, the wireless communication device 101 is powered by the battery 130 if there is no external accessory 201 connected to the accessory port 136. It is noted that a state 132, indicated as LPM (Low Power Mode), could also have been chosen as an initial state, when there is minimum power being supplied to the wireless communication device 101. In state 130, the identification processor 114 monitors for both a high logic level on the PCM-DIN line and a voltage on the GPIO line that indicates an external power source. If high logic level is not detected on the PCM-DIN line but external power is detected on the GPIO line, a HS_EXT_PWR_ON_K key 510 is delivered to change the state of the system 100 from state 130 to state 550. As indicated in the table of FIG. 3, the combination of an external power source and low logic level on the PCM-DIN line indicates that a charger is coupled to the wireless communication device 101.

In the previous step, if the identification processor 114 does detect a high logic level on the PCM-DIN line, which indicates the connection of some type of external accessory 201, then a HS_EXT_DEV_K key 504 is delivered to change the state of the system 100 from state 130 to state 552. In state 552, the identification processor 114 then checks for external power on the GPIO line. System 100 remains in state 552 if no external power is detected on the GPIO line, and checks for a device ID in the pad-byte of the data transmitted on the PCM-DIN line. From a review of the table of FIG. 3, this combination of high logic level on the PCM-DIN line and no external power on the GPIO line indicates that there is a headset 202, a computer interface, or an unknown device coupled to the wireless communication device 101.

Next, if a pad-byte corresponding to hexadecimal ID C1, shown in the table of FIG. 3 for a headset 202, is detected by identification processor 114, a HS_HEADSET_K key 508 is delivered to change the state of the system 100 from state 552 to state 202. Once this final identification is made, the wireless communication device 101 can properly interface with the headset 202. In the previous step, it is to be appreciated that if a hexadecimal device ID 00 of a computer interface or an ID of an unknown device are detected instead of the hexadecimal device ID C1, then a HS_DOTG_K key 514 or a HS_DEV_UNKNOWN_K key 516, corresponding to these two other devices respectively would have been delivered. As discussed above, identification processor 114 reads the pad-byte data repeatedly, as determined by the clock signal, to verify that there is no error in the pad-byte.

If, back in state 552, the identification processor 114 had detected external power on the GPIO line, then an HS_EXT_PWR_ON_K key 514 would have been delivered. This key 514 would change the state of the system 100 from state 552 to state 554. As will be described later below; at state 554, identification processor 114 reads the device ID transmitted from the coupled external accessory 201.

If the headset 202 is disconnected from accessory port 136 or if the headset 202 is disabled, a HS_PHONE_K key 506 is delivered to change the state of the system 100 from state 202 to state 130. Key 506 changes the PCM-DIN line back to logic low so that identification processor 114 can monitor for the next connection. Key 506 is delivered whenever an external accessory 201 is disabled or disconnected from the wireless communication device 101.

The procedure for identifying when an external accessory 201 with an external power source, such as the non-coil-cord carkit 210 shown in FIG. 2, is connected to the wireless communication device 101 will now be described. State 130 in the flow chart 500 of FIG. 5 is chosen once again as the initial state of the system 100, where there is no external accessory 201 connected and a battery 130 supplies power to the wireless communication device 101. Upon connection of an external accessory 201 to accessory port 136, the identification processor 114 detects external power on the GPIO line. From a review of the table of FIG. 3, this condition indicates that a battery charger, a computer interface, a non-coil-cord carkit 210, a coil-cord carkit, or an unknown device, is supplying external power to the wireless communication device 101. The HS_EXT_PWR_ON_K key 510, shown at the top of FIG. 5, is delivered to change the state of the system 100 from state 130 to state 550. The delivery of key 510 also simultaneously disables the battery 130. Once in state 550, the identification processor 114 then checks to see if the PCM-DIN line has high logic level. If high logic level is not detected on the PCM-DIN line, the system 100 remains in state 550, signifying that a charger is connected to the accessory port 136 (see FIG. 3).

If, in the previous step at state 550, high logic level is detected on the PCM-DIN line, then a HS_EXT_DEV_K key 505 is delivered to change the state of the system 100 from state 550 to state 554. From a review of the table of FIG. 3, the combination of external power on the GPIO line and logic high level status on the PCM-DIN line indicates a connection of a carkit, a computer interface, or an unknown device. In state 554, the identification processor 114 repeatedly reads for a device ID in the pad-byte of the transmitted data from the connected external accessory 201, using the clock intervals discussed above.

It should be noted that, in the process described above at state 130, the identification processor 114 first checked for external power on the GPIO line, and then subsequently checked for a high logic level status on the PCM-DIN line. In this fashion, the state of system 100 changed sequentially from state 130, to state 550, and to state 554. It is also possible to program the identification processor 114 to first check for the high logic level status on the PCM-DIN line before it checks for external power on the GPIO line. If identification processor 114 does this, the system 100 would change from state 130, to state 552, and to state 554. The end result is the same—the system 100 is at state 554.

Now referring to state 554, if the hexadecimal ID C2 of the non-coil-cord carkit 210 is identified, a HS_HFK_NOCORD_K key 512 is delivered to complete the interface by changing the state of the system 100 from state 554 to state 210. In the flow chart 500 of FIG. 5, state 210 is indicated as "HFK." HFK signifies a "Hands-Free Kit" for a carkit. It is to be appreciated that it would have been possible in state 554 to detect the device ID of other external accessories 201 that have an external power source and that transmit a high logic status on the PCM-DIN line. The corresponding keys for these external accessories 201, as shown in FIG. 4, would have been delivered in place of HS_HFK_NOCORD_K key 512.

Should the non-coil-cord carkit 210 or these other external accessories be subsequently disconnected from the wireless communication device 101, a HS_PHONE_K key 509 and a HS_EXT_PWR_OFF_K key 502 are delivered, resulting in the system 100 sequentially changing states from state 210, to state 550, and finally to state 130, where the phone battery 130 (see FIG. 1) resumes supplying power to the wireless communication device 101. In state 130, the identification processor 114 returns to the state where it monitors for high logic level status on the PCM-DIN line and for external power on the GPIO line.

It is to be understood that different external devices 201 can be connected to and disconnected from the accessory port 136 at any time period while the identification process of a previously connected external accessory 201 is occurring. FIG. 5 shows how the identification processor 114 processes these events. For example, if a headset 202 is connected while the identification processor 114 is still in the process of reading the device ID of the headset 202 in state 552, the user may suddenly disconnect the headset 202 and connect the carkit 210 to the accessory port 136. The momentary disconnection of the headset 202 will result in a HS_PHONE_K key 507 being delivered to change the state of the system 100 from state 552 to state 130. Once in state 130, the identification processor 114 will detect external power on the GPIO line and start a new identification procedure for the carkit 210, including the initial step of delivering the HS_EXT_PWR_ON_K key 510 to change the state of the system 100 from state 130 to state 550. The process of identifying the carkit 210 then repeats as previously described above. The flow chart 500 of FIG. 5 illustrates how this and other identification processes can be accomplished, and a person skilled in art would understand how these processes are accomplished by reviewing the figure.

In an embodiment of the present invention, once the external accessory 201 is identified, the identification processor 114 provides appropriate instructions to the other elements shown in FIG. 1 in housing 102 so that the user can perform functions such as adjusting the volume levels of the wireless communication device 101 or any of the accessories 201 which may be coupled to the wireless communication device. For example, once the type of external accessory 201 has been identified, the identification processor 114 generates selection data to select the appropriate program volumes for the external accessory 201 or the wireless communication device 101, which are stored in output data memory 118. The information in the output data memory 118 determines the output level at which output driver 124 will generate driving signals to drive the corresponding output device. The display 126 shows the volume level and a label for the external accessory 201 corresponding to that volume level. The techniques used to determine how the identification processor selects programmed volume levels for adjustment and display on display 126 are described in co-pending U.S. patent application No. 09/229, 132, entitled "SYSTEM AND METHOD FOR A MENU TITLE DISPLAY IN A WIRELESS COMMUNICATION DEVICE," filed on Jan. 12, 1999, and assigned to the assignee of the present application. This co-pending application is incorporated herein by reference in its entirety.

It is to be understood that even though various embodiments and advantages of the present invention have been set forth in the foregoing description, the above description is illustrative only, and reasonable changes can be made without departing from the spirit and scope of the invention. Accordingly, the invention is not to be limited by the foregoing description. Instead, the scope of the invention is to be determined on the basis of the claim or claims that follow, the interpretation of which are to be made in accordance with established doctrines of claim interpretation.

What is claimed is:

1. A wireless communication system, comprising:
   a housing;
   a wireless communication device contained within the housing, the wireless communication device including a transceiver for transmitting and receiving data and audio communications between the wireless communication device and a remote location;
   an accessory port mounted on the housing and accessible to an external accessory to allow the external accessory to be coupled to the wireless communication device, the accessory port including at least one data line;
   a processor included in the wireless communication device and communicatively coupled to the accessory port to sense activity on the data line when the external accessory is coupled to the accessory port, the processor further sensing identification data associated with the external accessory and using the identification data to identify the external accessory; and
   a storage area associated with the wireless communication device to store codes corresponding to a plurality of external accessories, the processor comparing the sensed identification data with the stored codes to identify the external accessory when the external accessory is coupled to the wireless communication device.

2. The system of claim 1 wherein the data line is a portion of a pulse code modulation (PCM) port.

3. The system of claim 1 wherein the processor generates a clock signal coupled to the accessory port, the external accessory transmitting identification data to the wireless communication device over the data line in response to the clock signal when the external accessory is coupled to the wireless communication device.

4. The system of claim 1 wherein the accessory port further includes an input line to transmit a voltage from the external accessory when the external accessory is coupled to the wireless communication device, the voltage indicative of whether the external accessory provides external power to the wireless communication device.

5. The system of claim 1 wherein the external accessory is one of a carkit for use in an automobile having an audio system, a headset, or a computer interface, the external accessory transmitting an identification code as part of the identification data when the external accessory is coupled to the wireless communication device.

6. The system of claim 1 wherein the external accessory is a charger to supply power to the wireless communication device when the charger is coupled to the wireless communication device.

7. The system of claim 1 wherein the activity on the data line includes a signal transmitted from the external accessory to indicate when the external accessory is coupled to the wireless communication device.

8. The system of claim 3, further comprising a clock line coupled to the accessory port and to the external accessory, the wireless communication device transmitting the clock signal to the external accessory over the clock line.

9. A wireless communication device coupleable to an external accessory, comprising:

a transceiver for transmitting and receiving data and audio communications between the wireless communication device and a remote location;

an accessory port to receive a data line attached to the external accessory to allow the external accessory to be coupled to the wireless communication device;

a processor to sense activity on the data line when the external accessory is coupled to the wireless communication device, the processor further sensing identification data associated with the external accessory and using the identification data to identify the external accessory;

an output driver to generate output signals, the output signals being coupled to the external accessory via the accessory port when the external accessory is coupled to the wireless communication device; and a storage location coupled to the processor the storage location storing data associated with a plurality of external accessories the stored data including an identification code corresponding to any one of the plurality of external accessories and the processor comparing the transmitted identification data with the stored data to identify the external accessory when the external accessory is coupled to the wireless communication device.

10. The device of claim 9 wherein the activity includes a signal transmitted by the external accessory when the external accessory is coupled to the wireless communication device and the identification data includes an identification code of the external accessory.

11. The device of claim 9 wherein the data line is a portion of a pulse code modulation (PCM) port, and the PCM port is coupleable to the accessory port.

12. The device of claim 9 wherein the accessory port further includes an input line for transmitting a voltage indicative of whether the external accessory supplies external power to the wireless communication device when the external accessory is coupled to the wireless communication device.

13. The device of claim 9 wherein the processor generates a clock signal, the processor reading the identification data transmitted by the external accessory during a period of time defined by the clock signal.

14. The device of claim 10 wherein the identification code is a binary number.

15. The device of claim 9 wherein the external accessory is one of a carkit for use in an automobile having an audio system, a headset, or a computer interface, the external accessory transmitting the identification data on the data line when the external accessory is coupled to the wireless communication device.

16. The device of claim 9 wherein the external accessory is a charger to supply power to the wireless communication device when the charger is coupled to the wireless communication device.

17. A method of determining when an external accessory is coupled to an accessory port of a wireless communication device and identifying the external accessory, the method comprising the steps of:

monitoring a data line for activity indicative of when the external accessory is coupled to the wireless communication device;

reading identification data transmitted by the external accessory on the data line when the external accessory is coupled to the wireless communication device; and comparing the transmitted identification data with stored information associated with a plurality of external accessories to identify the external accessory, wherein the wireless communication device includes a transceiver for transmitting and receiving data and audio communications between the wireless communication device and a remote location.

18. The method of claim 17 wherein the step of monitoring includes checking an input line for a voltage indicative of whether the external accessory supplies external power to the wireless communication device.

19. The method of claim 17, further comprising the step of generating a clock signal, the monitoring and reading steps occurring in response to a period of time defined by the clock signal.

20. The method of claim 19, further comprising the step of sending the clock signal to the external accessory, the external accessory transmitting the identification data in response to the clock signal.

21. The method of claim 17, further comprising, repeating the reading and comparing steps to obtain a consistent identification of the identification data.

22. The method of claim 17, further comprising, repeating the monitoring step to detect when the external accessory is coupled or uncoupled from the wireless communication device.

* * * * *